United States Patent

Goto et al.

[11] Patent Number: 5,815,063
[45] Date of Patent: Sep. 29, 1998

[54] POSITIVE TEMPERATURE COEFFICIENT THERMISTOR AND FABRICATION METHOD THEREOF

[75] Inventors: Yasushi Goto, Ikeda; Eiichi Koga, Neyagawa; Takuoki Hata, Moriguchi, all of Japan

[73] Assignee: Matsushita Electric Industrial Co., Ltd., Osaka, Japan

[21] Appl. No.: 729,071

[22] Filed: Oct. 10, 1996

Related U.S. Application Data

[63] Continuation of Ser. No. 238,899, May 6, 1994.

[30] Foreign Application Priority Data

Sep. 6, 1993 [JP] Japan ................................. 5-221092

[51] Int. Cl.$^6$ ........................................................ H01C 7/10
[52] U.S. Cl. .................................. 338/22 R; 338/22 SD; 252/520
[58] Field of Search ............................................... 338/22 R

[56] References Cited

U.S. PATENT DOCUMENTS

| | | | |
|---|---|---|---|
| 3,962,146 | 6/1976 | Matsuoka et al. | 252/520 |
| 3,975,307 | 8/1976 | Matsuo et al. | 252/520 |
| 4,014,822 | 3/1977 | Fujikawa | 252/520 |
| 4,175,060 | 11/1979 | Fleming, Jr. et al. | 252/518 |
| 4,403,236 | 9/1983 | Mandai et al. | 252/520 |
| 4,483,933 | 11/1984 | Kobayashi et al. | 252/521 |
| 4,716,279 | 12/1987 | Hori et al. | |
| 4,766,409 | 8/1988 | Mandai | 338/22 R |
| 4,834,052 | 5/1989 | Hori et al. | |
| 4,952,902 | 8/1990 | Kawaguchi et al. | 338/22 R |
| 5,219,811 | 6/1993 | Enomoto et al. | 252/521 |
| 5,238,911 | 8/1993 | Kuwajima et al. | 252/521 |
| 5,262,370 | 11/1993 | Negas et al. | 501/138 |

FOREIGN PATENT DOCUMENTS

| | | |
|---|---|---|
| 0415428 | 3/1991 | European Pat. Off. . |
| 3210083 | 10/1982 | Germany . |
| 58-053539 | 6/1983 | Japan . |

OTHER PUBLICATIONS

Junichi Arakawa et al., "Fabrication of Multilayer Positive Temperature Coefficient Resistor by Electrode Bonding Method," Japanese Journal of Applied Physics, No. 9B, Part 1, pp. 2330–2332, (1991).

Primary Examiner—Teresa J. Walberg
Assistant Examiner—Karl Easthom

[57] ABSTRACT

A positive temperature coefficient thermistor formed of a principal ingredient comprising barium titanate, lead titanate and calcium titanate, and rare earth elements, being particularly characterized by using calcium titanate as a raw material and having the particle diameter of said calcium titanate among raw material powders made smaller than that of other raw materials. The positive temperature coefficient thermistor formed by the present invention has improved durability in a reducing atmosphere due an increased density of the crystal structure.

6 Claims, 5 Drawing Sheets

POSITIVE TEMPERATURE COEFFICIENT THERMISTOR AND FABRICATION METHOD THEREOF

This is a continuation application of application Ser. No. 08/238,899, filed May 6, 1994.

BACKGROUND OF THE INVENTION

A. Field of the Invention

The present invention relates to a thermistor, resistance of which is changed sharply at a specified temperature, and particularly relates to a positive temperature coefficient thermistor for use in a reducing gas atmosphere and its fabrication method.

B. Prior Art

It has been widely known that a ceramic composite prepared by adding a very small amount of rare earth elements such as Y, La or Ce or transition metals such as Nb or Ta to barium titanate or a solid solution containing barium titanate, lead titanate and calcium titanate has a semiconductive property and shows positive temperature coefficient (shortened to PTC) characteristics resistance at a temperature near its Curie point.

Prior art ceramic composites have been used in a great variety of applications such as overcurrent protection devices, temperature control devices, motor starting devices, and heater temperature control devices utilizing PTC characteristics. As applications for these composites expand, requirements for their electrical characteristics have proliferated. Where ceramic composites are used as heating elements for hot air type heaters, heating start temperatures, usually referred to as switching temperature, is required to be high, and a thermistor made of a material of barium lead titanate system, which is prepared by substituting a part of the barium site of barium titanate with lead, and having a switching temperature of 200° C. to 300° C. is usually employed. For example, with a hot air type heating system, air flow generated by an air blower located in the back hits a heated PTC thermistor, the temperature of the PTC thermistor having reached a constant temperature level by self-heating, is warmed and blown out of a warm air vent located in the front.

In the prior art, PTC thermistors have been manufactured according to the following method:

(1) Raw materials are weighed and blended, for example, by means of a ball mill or a dispersion mill;

(2) After being dehydrated and dried, for example, in a filter press or a drum dryer, the mixed powder is calcined;

(3) The calcined powder is ground, for example, in a ball mill;

(4) A binder is added to the ground powder to make a slurry, and the slurry is granulated, for example, in a spray dryer, and then molded to required shapes; and (5) The molded shapes are fired in air at a temperature ranging from 1300° C. to 1400° C.

Electrodes are then attached to the obtained sintered shapes.

Raw materials corresponding to the principal ingredients to be blended have included barium carbonate, calcium carbonate and lead oxide. As subordinate ingredients, yttrium oxide, lanthanum oxide, samarium oxide, cerium oxide, aluminum oxide, silicon dioxide and manganese dioxide are known.

Prior art PTC thermistors have the disadvantage that, due to deterioration in PTC characteristics, such as markedly decreased resistance, greatly reduced resistance temperature coefficient values become likely when these thermistors are used in a reducing or neutral atmosphere. Thermistors intended for use in organic substances such as gasoline, machine oil, cooking oil, flavorings and detergents are subject to such a reducing environment. In these environments, a reductive reaction occurs which causes deterioration of the elements and necessitates taking additional measures, such as installing a protective case or other means, to safeguard the elements.

As a result, the disadvantage exists in the prior art of requiring restrictive operating conditions of the products in which PTC thermistors are used. Particularly, in the case of hot air type heaters wherein the surface of the thermistor is exposed to a severe environment of circulating air flow containing the aforementioned oil ingredients, often at temperatures exceeding 200° C., deterioration of the PTC thermistors takes place readily.

None of the prior art described above has the important advantages of significantly reducing the change in resistance values and thus having improved durability in a reducing atmosphere. Moreover, none of the prior art described above allows improved safety while using a PTC thermistor by reducing the chance of explosion.

SUMMARY OF THE INVENTION

An object of the present invention is to provide a positive temperature coefficient thermistor having a high level of reliability.

A further object of the present invention is to provide a positive temperature coefficient thermistor having improved durability in reducing atmospheres and thus being subject to minimal deterioration in PTC characteristics, such as resistance characteristics, in such an environment.

A further object of the present invention is to provide a positive temperature thermistor which is durable and reliable, and further is safe for use in organic substances such as gasoline, machine oil, cooking oil, flavorings and detergents.

According to the present invention, a positive temperature coefficient thermistor is provided having a principal ingredient comprising barium titanate, lead titanate and calcium titanate, and a subordinate ingredient comprising silicon dioxide, manganese dioxide and at least one oxide selected from the group consisting of yttrium oxide, lanthanum oxide, samarium oxide, dysprosium oxide, cerium oxide and gallium oxide, wherein the thermistor resists deterioration in a reductive atmosphere.

Preferably, the subordinate ingredient additionally comprises aluminum oxide.

Further preferably, the positive temperature coefficient thermistor includes 100 mol % of a principal ingredient comprising about 40 to about 95 mol % of barium titanate, about 4 to about 40 mol % of lead titanate and about 1 to about 20 mol % of calcium titanate, and further comprises, by comparison to the 100 mol % of said principal ingredient, a subordinate ingredient comprising about 1.0 to about 5.0 mol % of silicon dioxide, about 0.01 to about 0.15 mol % of manganese dioxide, about 0.1 to about 2.0 mol % of aluminum oxide, and about 0.1 to about 0.4 mol % of at least one oxide selected from the group consisting of yttrium oxide, lanthanum oxide, samarium oxide, dysprosium oxide, cerium oxide and gallium oxide.

Still more preferably, the positive temperature coefficient thermistor of the invention includes a mol ratio of the barium site ingredient totaling barium, lead and calcium of said principal ingredient comprising barium titanate, lead titanate and calcium titanate to the titanium site ingredient in the range of about 1.003 to about 1.030 mol.

Still more preferably, the positive temperature coefficient thermistor according to the invention additionally comprises strontium titanate as a principal ingredient.

Also according to the present invention, a method for fabricating a positive temperature coefficient thermistor having a principal ingredient comprising barium titanate, lead titanate and calcium titanate, and a subordinate ingredient comprising silicon dioxide, manganese dioxide and at least one oxide selected from the group consisting of yttrium oxide, lanthanum oxide, samarium oxide, dysprosium oxide, cerium oxide and gallium oxide, is provided comprising the steps of:

a. mixing raw material powder corresponding to the principal ingredient comprising a titanium compound, a barium compound, a lead compound and a calcium compound with powder of raw material corresponding to the subordinate ingredient comprising a silicon compound, a manganese compound and a compound comprising at least one element selected from the group consisting of yttrium, lanthanum, samarium, dysprosium, cerium and gallium;

b. calcining said mixed powder;

c. grinding said calcined powder into pieces;

d. molding said ground powder into shapes; and e. firing said molded shapes, wherein the thermistor resists deterioration in a reductive atmosphere.

Preferably, calcium compound raw material powder comprises calcium titanate.

Further preferably, the mean particle diameter of the calcium titanate raw material powder is smaller than the mean particle diameter of the remaining raw material powders.

Still more preferably, the mean powder particle diameter of the raw materials corresponding to the principal ingredient and the subordinate ingredient is less than about 1.3 $\mu$m during said step (a).

Still more preferably, the mean particle diameter of the ground powder subsequent to said step (c) ranges from 0.6 to 2.0 $\mu$m.

As pointed out in greater detail below, the positive temperature coefficient thermistor of the present invention provides the important advantage of avoiding a significant deterioration in resistance-temperature characteristics such as room temperature resistance, resistance-temperature coefficient and resistance change width values after the application of voltage in a reductive atmosphere. Moreover, the positive temperature coefficient thermistor according to the present invention provides improved durability and safety of use as well as improved economy of production when installed in objects such as a hot air type heater.

The invention itself, together with further objects and attendant advantages, will best be understood by reference to the following detailed description taken in conjunction with the accompanying drawings.

DETAILED DESCRIPTION OF THE INVENTION

Figure 1:
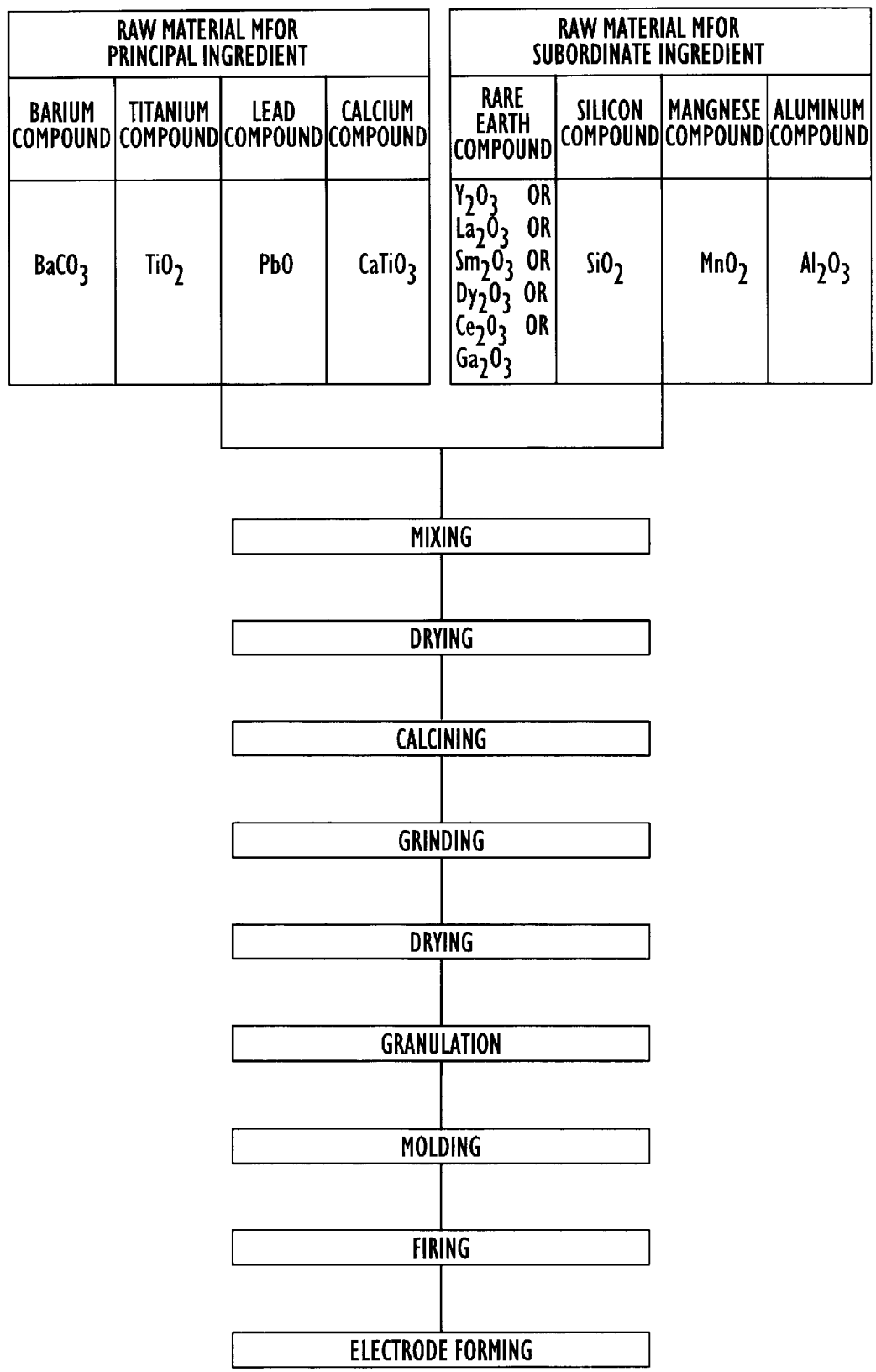
FIG. 1 illustrates a fabrication method chart for a positive temperature coefficient thermistor device according to the present invention.
Figure 2:
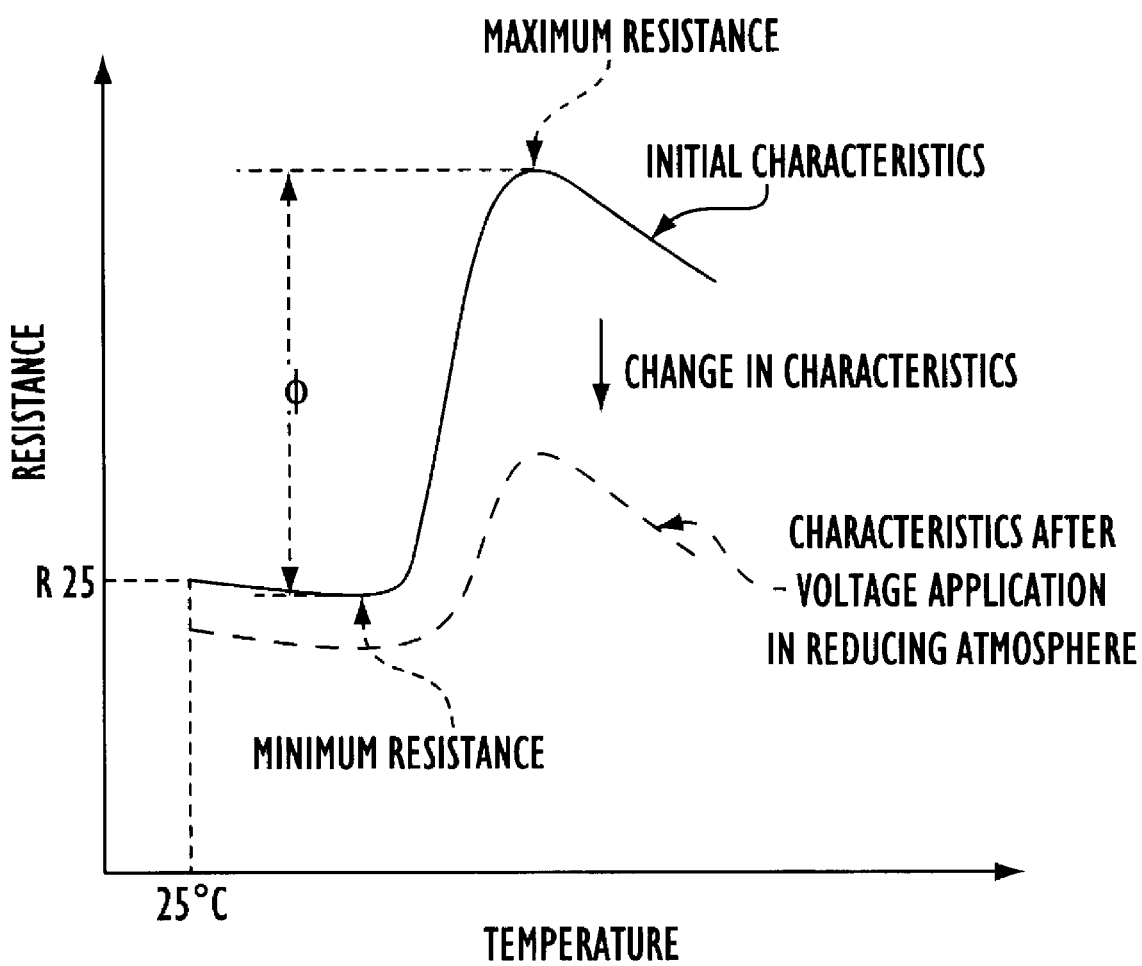
FIG. 2 illustrates a diagram to show the resistance-temperature characteristics of a positive temperature coefficient thermistor device according to the present invention.

A thermistor according to a preferred embodiment of the present invention includes a principal ingredient comprising barium titanate, lead titanate and calcium titanate. The principal ingredient may be formed from any raw material powder or powders of titanium, barium, lead or calcium compounds. The ultimate composition of the principal ingredient of the PTC thermistor generally comprises crystals of a tetragonal system perovskite structure formed of solid barium titanate, calcium titanate and lead titanate. Carbonates, oxides, titanates, zirconates, stannates, ethoxides and oxalate compounds, or any other art-recognized equivalent, of the titanium, barium, lead, and calcium elements may be used as the raw materials for the principal ingredient of the present invention.

Preferably, when calcium titanate is included as a principal ingredient in the method according to the present invention, it is derived from a raw material which is a calcium titanate powder. When calcium carbonate is used as a raw material powder, the density of the structure of the thermistor element is likely to be lessened because of the carbon dioxide gas emitted at the time of firing. In contrast, the use of calcium titanate as a raw material results in a denser structure for the final PTC thermistor element product.

The thermistor of the present invention further comprises a subordinate ingredient. The subordinate ingredient is generally a compound comprising trivalent rare earth elements, pentavalent transition metallic elements or art recognized equivalent compounds to provide semiconductivity. Preferably, a compound comprising trivalent rare earth elements is chosen to improve the durability of the PTC thermistor against a reducing atmosphere. These pentavalent and trivalent materials are believed to effect an improvement in packing of the unit cells in the crystal structure in the thermistor. As a result, it is believed that a corresponding suppression of release of oxygen is realized because of the substitution of barium, which has a large ion radius, with trivalent rare earth elements of a smaller ion radius.

The subordinate ingredient comprises at least one compound selected from the group consisting of yttrium oxide, lanthanum oxide, samarium oxide, dysprosium oxide, cerium oxide and gallium oxide. The subordinate ingredient further comprises silicon dioxide and manganese dioxide. Preferably, aluminum oxide is additionally added as a subordinate ingredient. The addition of aluminum oxide acts as an acceptor and improves the durability of the positive temperature coefficient thermistor in reducing environments.

As a suitable raw material for the subordinate ingredient, any raw material powder of a silicon compound, a manganese compound and at least one compound selected from the group consisting of yttrium, lanthanum, samarium, dysprosium, cerium or gallium may be used. The oxides, nitrates, oxalates, carbonates and hydroxides of each respective element may be used as the raw materials for the subordinate ingredient. Generally, the ultimate composition of the subordinate ingredient comprises a silicon oxide, a manganese oxide and at least one oxide selected from the group consisting of yttrium oxides, lanthanum oxides, samarium oxides, dysprosium oxides, cerium oxides and gallium oxides, and optionally an aluminum oxide.

Oxides are advantageously used as the raw material powder for the subordinate ingredient to ensure that the subordinate ingredient has semiconductive properties. However, the raw materials employed are not limited only to oxides. For example, compounds such as oxalates or nitrates may be used as the raw materials and result in thermistors showing excellent durability against a reducing atmosphere. Further, manganese nitrate and manganese carbonate may be used as raw material powder in place of manganese oxide. Still further, aluminum nitrate and aluminum hydroxide may be used as raw material powder in place of aluminum oxide.

Preferably, the mean particle diameter of the raw material powder of calcium titanate is smaller than the mean value of the diameters of all other raw material powders. By controlling particle diameters in this way, a solution reaction with barium titanate is facilitated, and an improvement in the packing of unit cells in the crystal structure is achieved in the same way as by using rare earth elements.

Also preferably, the principal ingredient, e.g., barium titanate, lead titanate and calcium titanate, have a composition ratio between the barium site ingredient formed of Ba, Pb and Ca and the titanium site ingredient so as to make the amount of barium site ingredient greater than the titanium site ingredient in a ratio of about 1.003 to about 1.030 mol of barium site ingredient to 1.000 mol of titanium site ingredient, resulting in a composition exhibiting non-stoichiometry. With the foregoing composition ratio, the durability of thermistors according to the present invention is increased in the presence of a reducing atmosphere.

While not wishing to be bound by theory, it is believed that the increased durability of the present thermistors is due to effecting a denser resulting crystal structure of the thermistor elements as a result of grain growth suppression. It is further believed that grain growth suppression is caused by the creation of non-stoichiometry of the thermistor principal ingredient, as discussed above. Similarly, grain growth suppression is believed to be effected by an excess of barium site ingredient causing positive ion defects. Additionally, it is believed that grain growth suppression may be caused by the addition of silicon dioxide as a sintering agent which acts as an oxygen acceptor.

To realize an excessive barium site with the composition mol ratio of the barium site to the titanium site being about 1.003 to about 1.030:1, the amount of each respective raw material is controlled at the time of raw material mixing. An alternative method of controlling the barium site composition is to mix each respective raw material in the first step to make the composition ratio between the barium site and the titanium site 1:1. After calcining, barium oxide, lead oxide or calcium oxide is added in an amount of about 0.003 to about 0.030 mol per 1 mol of the principal ingredient. To this mixture, a finishing firing is applied. Also alternatively, it is possible to reduce the amount of titanium site ingredient instead of increasing the barium site, namely to reduce $TiO_2$ by 0.003 to 0.03 mol keeping the mol ratio of barium site ingredient to titanium site ingredient in the range of 1.003 to 1.030.

In the fabrication method, it is preferable to control the mean particle diameter of the raw materials and downstream products thereof for both the principal and subordinate ingredients. Generally, the particle size does not exceed about 1.3 µm at the time of mixing before calcining, and is within a range of about 0.6 to about 2.0 µm subsequent to grinding after calcining. By controlling the method of production of thermistors, according to these criteria, the durability of the thermistors according to the present invention against a reducing atmosphere will be improved.

By controlling the mean particle diameter at the time of mixing to not exceed about 1.3 µm, reactivity at the time of calcining is improved with a resulting denser composition structure of the thermistor elements. By controlling the mean particle diameter subsequent to grinding after calcining to a range of 0.6 to 2.0 µm, it becomes possible to make the diameters of crystal particles of the thermistor elements uniform and finer. By the aforementioned fabrication method, it is made possible to prevent the reducing substances from infiltrating into positive temperature coefficient thermistors with a resultant improvement of the durability against a reducing atmosphere.

It is also possible to fabricate thermistors having excellent durability against a reducing atmosphere by means of solution phase methods such as a sol-gel method using a metal ethoxide $(M(OEt)_2)$ such as barium ethoxide, or a coprecipitation method using, for example, titanium barium oxalate $(BaTiO(C_2O_4)_2 \cdot 4H_2O)$.

The relationship between PTC characteristics and the potential barriers of grain boundaries is disclosed in Heywang. For example, in the temperature range above the Curie point, potential barriers increase exponentially. The grain boundary resistance can be expressed by the following equation:

$$p = p_o \exp(\phi/kT) \qquad (1)$$

where
$p_o$, k: constants
$\phi$: potential, e.g., height of barriers
T: absolute temperature Oxygen attached by absorption to the surfaces of crystal grains are believed to be involved with forming potential barriers. Therefore, deterioration in positive temperature coefficient characteristics is believed to be the result of lowering the potential barriers in the grain boundaries. For example, reducing substances, such as oil, infiltrate the pores on the surfaces of elements and take oxygen away from the grain boundaries. As a result, the resistance of the grain boundary is reduced, and deterioration in the positive temperature coefficient occurs.

The reducing reaction which occurs can be expressed by the following formula:

$$O^{2-} \leftrightarrows \tfrac{1}{2} O_2 + 2e \qquad (2)$$

($O_2$: absorbed oxygen, e: conduction electron)

As the reducing reaction further proceeds, oxygen is believed to be taken away from lattices, too. At that time, the reaction can be expressed by the following formula:

$$O_o \leftrightarrows \tfrac{1}{2} O_2 + V_o + 2e \qquad (3)$$

($O_o$: oxygen on lattices, $V_o$: oxygen holes)

The durability of thermistor elements is improved against a reducing atmosphere by the present invention because the reaction expressed by formula (2) is suppressed by a denser composition structure of elements, and because the reaction expressed by formula (3) is suppressed by an improvement in packing of crystal lattices themselves.

While not wishing to be bound by theory, it is believed that deterioration of characteristics of PTC thermistors in a reducing atmosphere is the result of free electrons created by oxygen defects and affect conductivity. To improve durability of PTC thermistors against a reducing atmosphere, some or all of the following characteristics are advantageous:

1) the thermistor should have a crystal structure which does not readily allow formation of oxygen defects and impedes the release of oxygen;

2) a fine structure which is densely constructed so as to prevent reducing substances or other undesirable substances from infiltrating into the thermistors; and 3) the use of additives which have an acceptor-like role to trap the created free electrons.

Based on the material design concept as enumerated above, it was possible to arrive at a unique and novel thermistor and method of fabrication, resulting in the present invention.

Further variations in the exemplary embodiments of the present invention are possible. For example, if the resulting composition of a thermistor has a principal ingredient comprising barium titanate, lead titanate and calcium titanate, and a subordinate ingredient comprising silicon dioxide, manganese dioxide and at least one oxide selected from the group consisting of yttrium oxide, lanthanum oxide, samarium oxide, dysprosium oxide, cerium oxide and gallium oxide there are no restrictions imposed on the raw material powders to be used to attain that result. It is also possible to produce a thermistor which additionally contains strontium as a principal ingredient for the purpose of controlling the Curie temperature of the thermistor.

As yet another variation, it is possible to produce a thermistor which contains additional compounds or elements as a subordinate ingredient for the purpose of controlling the semiconductive properties.

As yet another variation, it is possible to produce a thermistor which contains additional compounds or elements as a subordinate ingredient for the purpose of making the structure of the finished thermistor much denser.

Positive temperature coefficient thermistors of the present invention have the advantage of allowing a significant reduction in the deterioration of resistance value characteristics. Particularly, significant reductions in temperature coefficient of resistance may be eliminated even if the thermistors are used in a reducing or neutral atmosphere. Accordingly, positive temperature coefficient thermistors according to the present invention have the advantage of being less restrictive in their operating conditions, and thus allow a wider range of applications.

Use of the positive temperature coefficient thermistors of the present invention in hot air type heaters also has the advantage of elimination of the necessity of taking additional measures to protect the thermistor elements from reducing atmospheres, such as installing a protective casing to cover the thermistor elements or designing a hermetically sealed construction for the thermistor elements. Thus, it has become possible to reduce the number of processing steps and also reduce production costs.

Furthermore, the thermistors of the present invention have the advantage of effecting increased safety. For example, the possibility of thermal runaway resulting in a breakage of elements is reduced along with any corresponding changes caused by fire because the thermistor elements of the present invention show significantly less deterioration in characteristics.

As detailed in the foregoing, the present invention makes it possible to produce positive temperature coefficient thermistors which have little deterioration in characteristics even in a reducing or neutral atmosphere, providing significant industrial advantages over the prior art.

The foregoing invention will be further described with the following examples, which are illustrative and not limitative of the invention described herein.

EXAMPLE 1

In this example, various blends of compositions were prepared according to the fabrication conditions shown in Table 1.

As indicated in the fabrication method chart of FIG. 1, a raw material powder corresponding to a principal ingredient comprising barium carbonate ($BaCO_3$), titanium oxide ($TiO_2$), lead oxide (PbO) or calcium titanate ($CaTiO_3$) and a raw material powder corresponding to a subordinate ingredient comprising silicon dioxide ($SiO_2$), manganese dioxide ($MnO_2$), aluminum oxide ($Al_2O_3$) and at least one oxide selected from the group consisting of yttrium oxide ($Y_2O_3$), lanthanum oxide ($La_2O_3$), samarium oxide ($Sm_2O_3$), dysprosium oxide ($Dy_2O_3$), cerium oxide ($Ce_2O_3$) and gallium oxide ($Ga_2O_3$) are mixed as raw materials and weighed respectively to form the compositions indicated and numbered in Table 1.

These raw materials were wet mixed in a ball mill. Then, the foregoing mixture was calcined at 1100° C. for 2 hours after being dried. After that, the calcined powder was wet ground in a ball mill. The ground powder was then dried, combined with 5% of polyvinyl alcohol serving as a binder, granulated, and press molded under a pressure of 800 $Kg/cm^2$. The molded shape was fired in air at about 1350° C. for 1 hour. Positive temperature coefficient thermistor devices corresponding to the sample formulations in Table 1 were produced, each having a disc shape of 20 mm in diameter and 2.0 mm in thickness. After application of Ni plating to the sintered bodies, silver paste was applied thereon as a coating and baked to complete the formation of electrodes.

The particle diameter of the calcium titanate contained in the raw materials was changed against the mean particle diameter of the mixed powder as indicated in the first column from the right in Table 1.

In Table 1, the principal ingredient is represented by the end product ingredient of the thermistor, namely $BaTiO_3$ (barium titanate, shortened to BT), $PbTiO_3$ (lead titanate, shortened to PT), $CaTiO_3$ (calcium titanate, shortened to CT) and $SrTiO_3$ (Strontium titante, shortened to ST), and not by the specific raw materials used in the mixing step.

The "mol %" values of the subordinate ingredient were expressed by the ratio against the total of the principal ingredient, the entirety of the principal ingredient being as 100 mol %. The sum total of both the principal and subordinate ingredients thus exceeds 100 mol % in Table 1.

The raw material for the calcium ingredient used in preparing sample number 22 was calcium carbonate, and for all other samples was calcium titanate.

The particle diameter of the calcium titanate powder used as a raw material for samples 6 and 21 was larger than the mean particle diameter of the other raw material powders in those samples. Sample 25 is a thermistor prepared with calcium titanate added after calcining. Sample 26 is a thermistor comprising strontium titanate.

The electrical characteristics of all the samples thus prepared were examined. With each sample, resistance-temperature characteristics were measured and expressed by a curve, and room temperature resistance ($R_{25}$), resistance-temperature coefficient ($\alpha$), and resistance change width ($\phi$) were examined from the curve. To evaluate the withstanding capability against a reducing atmosphere, voltage of 100 V was applied to the samples for 100 hours in a reducing atmosphere of nitrogen gas, and then characteristics data after applying voltage was taken again by no-load to examine $R_{25}$, $\alpha$, and $\phi$. The results of said examination are shown in Table 2.

The resistance change width ($\phi$) is a common logarithm of a numerical value obtained by dividing the maximum resistance with the minimum resistance, and expressed by the following equation:

$$\phi = \text{Log}_{10} (\text{Max. Resistance/Min. Resistance})$$

In conclusion, it is desirable to have larger values of $\alpha$ and $\phi$ and thus smaller changes in $R_{25}$, $\alpha$ and $\phi$ between the measurements before and after application of voltage.

TABLE 1

| Sample Number | Principal Ingredient (mol %) | | | | Subordinate Ingredient (mol %) | | | | | Mean Particle Diameter Of Raw Mixed Powder ($\mu$m) | Mean Particle Diameter of Raw Calcium Titanate ($\mu$m) |
|---|---|---|---|---|---|---|---|---|---|---|---|
| | Barium Titanate (BT) | Lead Titanate (PT) | Calcium Titanate (CT) | ST | Rare Earth Ingredient Y, La, Ce, Ga, Sm, Dy | | Mn Ingredient | Al Ingredient | Si Ingredient | | |
| 1 | 39 | 31 | 30 | | Y | 0.2 | 0.1 | 0 | 2.0 | 1.1 | 0.9 |
| 2 | 96 | 3 | 1 | | Y | 0.2 | 0.1 | 0 | 2.0 | 1.1 | 0.9 |
| 3 | 50 | 45 | 5 | | Y | 0.2 | 0.1 | 0 | 2.0 | 1.0 | 0.9 |
| 4 | 80 | 20 | 0 | | Y | 0.2 | 0.1 | 1.0 | 2.0 | 0.9 | — |
| 5 | 49 | 20 | 31 | | Y | 0.2 | 0.1 | 1.0 | 2.0 | 1.2 | 0.8 |
| 6 | 70 | 20 | 10 | | Y | 0.2 | 0.1 | 0 | 2.0 | 1.2 | 1.4 |
| 7 | 70 | 20 | 10 | | Y | 0.08 | 0.1 | 1.0 | 2.0 | 1.1 | 0.9 |
| 8 | 70 | 20 | 10 | | Y | 0.45 | 0.1 | 1.0 | 2.0 | 1.1 | 0.9 |
| 9 | 70 | 20 | 10 | | Y | 0.2 | 0 | 1.0 | 2.0 | 1.0 | 0.8 |
| 10 | 70 | 20 | 10 | | Y | 0.2 | 0.17 | 1.0 | 2.0 | 1.0 | 0.8 |
| 11 | 70 | 20 | 10 | | Y | 0.2 | 0.1 | 0.1 | 2.0 | 1.1 | 0.8 |
| 12 | 70 | 20 | 10 | | Y | 0.2 | 0.1 | 2.2 | 2.0 | 1.2 | 0.8 |
| 13 | 70 | 20 | 10 | | Y | 0.2 | 0.1 | 1.0 | 0 | 1.1 | 0.9 |
| 14 | 70 | 20 | 10 | | Y | 0.2 | 0.1 | 1.0 | 5.5 | 1.2 | 0.9 |
| 15 | 70 | 20 | 10 | | Y | 0.2 | 0.1 | 1.0 | 2.0 | 1.2 | 0.9 |
| 16 | 70 | 20 | 10 | | Ce | 0.1 | 0.1 | 1.0 | 2.0 | 1.2 | 0.9 |
| 17 | 60 | 25 | 15 | | Ga | 0.35 | 0.01 | 1.0 | 2.0 | 1.2 | 0.9 |
| 18 | 60 | 25 | 15 | | La | 0.2 | 0.1 | 1.0 | 2.0 | 1.1 | 0.8 |
| 19 | 60 | 25 | 15 | | Dy | 0.2 | 0.1 | 1.0 | 2.0 | 1.2 | 0.9 |
| 20 | 40 | 40 | 20 | | Sm | 0.2 | 0.08 | 1.5 | 3.0 | 1.2 | 1.0 |
| 21 | 40 | 40 | 20 | | Sm | 0.3 | 0.12 | 0.5 | 2.4 | 1.3 | 1.5 |
| 22 | 80 | 15 | (5) | | Y | 0.35 | 0.1 | 1.5 | 3.0 | 1.2 | 0.9 |
| 23 | 80 | 15 | 5 | | Y | 0.38 | 0.15 | 2.0 | 5.0 | 1.2 | 0.9 |
| 24 | 95 | 4 | 1 | | Y | 0.40 | 0.15 | 2.0 | 5.0 | 1.3 | 0.8 |
| 25 | 70 | 20 | 10 | | Y | 0.2 | 0.1 | 1.0 | 2.0 | 1.2 | 0.9 |
| 26 | 70 | 20 | 5 | 5 | Y | 0.2 | 0.1 | 1.0 | 2.0 | 1.2 | 0.9 |

TABLE 2

| Sample Number | Characteristics before Voltage Application | | | Characteristics after Voltage Application | | |
|---|---|---|---|---|---|---|
| | R25 ($\Omega$) | $\alpha$ (%/°C.) | $\phi$ | R25 ($\Omega$) | $\alpha$ (%/°C.) | $\phi$ |
| 1 | 629 | 10 | 4.8 | 201 | 3 | 1.1 |
| 2 | 248 | 13 | 5.8 | 37 | 6 | 2.2 |
| 3 | 2723 | 16 | 2.3 | 625 | 3 | 0.8 |
| 4 | 153 | 11 | 6.3 | 25 | 3 | 1.8 |
| 5 | 2587 | 15 | 4.6 | 2329 | 5 | 2.0 |
| 6 | 1821 | 10 | 3.8 | 1531 | 4 | 2.0 |
| 7 | 1288 | 14 | 5.5 | 307 | 5 | 1.9 |
| 8 | 1588 | 11 | 4.4 | 1480 | 4 | 1.6 |
| 9 | 325 | 7 | 4.0 | 101 | 2 | 1.7 |
| 10 | 3521 | 9 | 4.4 | 823 | 4 | 1.6 |
| 11 | 383 | 15 | 5.8 | 352 | 14 | 5.0 |
| 12 | 687 | 7 | 4.8 | 129 | 4 | 1.7 |
| 13 | 3335 | 6 | 3.5 | 1020 | 3 | 1.4 |
| 14 | 1587 | 10 | 4.1 | 225 | 4 | 1.6 |
| 15 | 400 | 16 | 5.8 | 396 | 16 | 5.7 |
| 16 | 580 | 17 | 6.0 | 571 | 17 | 5.8 |
| 17 | 882 | 12 | 4.0 | 880 | 12 | 4.8 |
| 18 | 487 | 17 | 5.9 | 486 | 17 | 5.9 |
| 19 | 775 | 18 | 6.2 | 772 | 17 | 6.2 |
| 20 | 827 | 17 | 6.0 | 825 | 17 | 6.0 |
| 21 | 859 | 17 | 6.3 | 245 | 7 | 3.0 |
| 22 | 628 | 16 | 5.9 | 192 | 8 | 3.1 |
| 23 | 391 | 16 | 6.5 | 385 | 16 | 6.4 |
| 24 | 803 | 17 | 6.3 | 780 | 16 | 6.0 |

TABLE 2-continued

| Sample Number | Characteristics before Voltage Application | | | Characteristics after Voltage Application | | |
|---|---|---|---|---|---|---|
| | R25 (Ω) | α (%/°C.) | φ | R25 (Ω) | α (%/°C.) | φ |
| 25 | 422 | 16 | 5.9 | 401 | 16 | 5.8 |
| 26 | 458 | 18 | 6.1 | 432 | 18 | 6.0 |

As clearly seen from the results of evaluation of Table 2, the samples containing a principal ingredient comprised of $BaTiO_3$ (40 to 95 mol %), $PbTiO_3$ (4 to 40 mol %) and $CaTiO_3$ (1 to 20 mol %), and a subordinate ingredient comprised of $SiO_2$ (1.0 to 5.0 mol %), $MnO_2$ (0.001 to 0.15 mol %), and $Al_2O_3$ (0.1 to 2.0 mol %) and at least one oxide (0.1 to 0.4 mol %) selected from the group consisting of $Y_2O_3$, $La_2O_3$, $Sm_23$, $Dy_2O_3$, $Ce_2O_3$ and $Ga_2O_3$ show particularly excellent durability against a reducing atmosphere.

In other words, the samples of the foregoing composition show larger values in resistance-temperature coefficient (α) and resistance change width (φ) and smaller changes in room temperature resistance ($R_{25}$), resistance-temperature coefficient (α) and resistance change width (φ) between the measurements before and after application of voltage.

The samples prepared by using a calcium titanate raw material powder having a particle diameter smaller than the mean particle diameter of all other ingredients show smaller changes in $R_{25}$, (α) and, (φ) and show excellent durability against a reducing atmosphere.

In addition to the composition of the foregoing examples, the samples having strontium titanate added to control the Curie temperature of the thermistors to be prepared have particularly excellent durability against a reducing atmosphere.

Further, in the fabrication method of the foregoing example, thermistor samples prepared by adding raw material powder of calcium titanate to the mixed powder of all other raw materials (except calcium titanate) after calcining show particularly excellent durability against a reducing atmosphere.

EXAMPLE 2

As the second exemplary embodiment, thermistors were prepared for the purpose of comparing samples having a composition mol ratio of barium site ingredient to titanium site ingredient of between 1.003 and 1.030 with samples prepared with other ratios.

Samples numbered 31 to 36, as shown in Table 3, use the same raw materials as used in Example 1 with each respective raw material weighed so as to make the principal and subordinate ingredients constituting the composition of the end products, e.g., barium titanate, lead titanate and calcium titanate, constitute the composition expressed by $(Ba_{0.7}, Pb_{0.2}, Ca_{0.1})_x(Ti)_yO_3+0.002Y_2O_3+0.02SiO_2+0.001$ $MnO_2$. The amount of barium site ingredient (x) and the titanium site ingredient (y) of each sample was adjusted to conform to the ratio of x/y as indicated in Table 3. Each respective sample was then prepared according to the method used in Example 1.

Electrical characteristics and durability against a reducing atmosphere were then examined on each sample obtained, and the results shown in Table 3.

Figure 3:
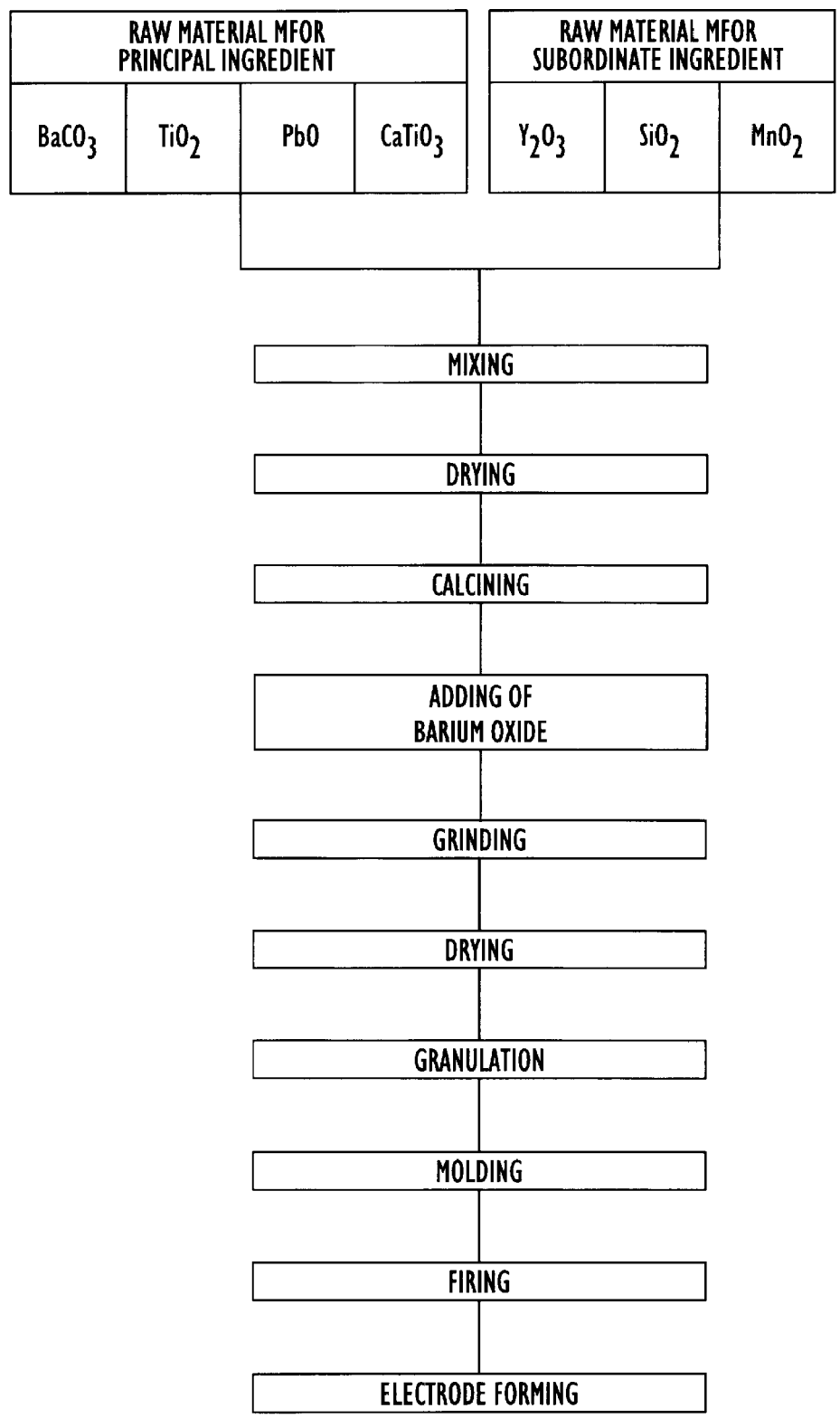
FIG. 3 illustrates a fabrication method chart for a positive temperature coefficient thermistor device according to the present invention.

Sample numbers 37 to 41 were prepared according to the fabrication methods shown in FIG. 3 showing a method flow chart for the positive temperature coefficient thermistor of the present invention.

As shown in FIG. 3, the principal ingredient of $BaCO_3$, $TiO_2$, PbO, $CaTiO_3$, was first mixed with the subordinate ingredient of $Y_2O_3$, $SiO_2$ and $MnO_2$ so that the composition of the mixture conformed to the ratio of x/y=1. The mixture was dried and calcined. After that, BaO was added to each sample as shown in Table 3 for sample numbers 37 to 41. Next, said each respective mixture was ground, dried, granulated, and molded according to the same methods employed in Example 1. Each sample was finished after firing the molded shapes.

As shown in the results of the evaluation in Table 3, the samples having a ratio x/y of the barium site (x) and the titanium site (y) ranging from 1.003 to 1.030 show less deterioration in PTC characteristics after being subjected to a reducing atmosphere. Even when BaO was added in excess of x/y=1.000 by 0.003 to 0.03 mol after calcining, an improvement in durability against a reducing atmosphere was recognized.

TABLE 3

| Sample Number | x/y Ratio | BaO (mol %) | Characteristics before Voltage Application | | Characteristics After Voltage Application | |
|---|---|---|---|---|---|---|
| | | | R25 (Ω) | φ | R25 (Ω) | φ |
| 31 | 0.990 | — | 23.7 | 5.4 | 10.6 | 2.3 |
| 32 | 1.000 | — | 56.3 | 6.0 | 24.1 | 2.1 |
| 33 | 1.003 | — | 107 | 5.7 | 102 | 5.6 |
| 34 | 1.010 | — | 201 | 5.6 | 185 | 5.3 |
| 35 | 1.030 | — | 487 | 5.8 | 471 | 5.6 |
| 36 | 1.035 | — | 1028 | 5.3 | 425 | 2.8 |
| 37 | 1.000 | 0.001 | 73.8 | 5.9 | 30.4 | 2.2 |
| 38 | 1.000 | 0.003 | 182 | 5.7 | 169 | 5.5 |
| 39 | 1.000 | 0.01 | 334 | 5.6 | 309 | 5.4 |
| 40 | 1.000 | 0.03 | 984 | 5.5 | 954 | 5.3 |
| 41 | 1.000 | 0.035 | 1125 | 5.3 | 629 | 3.0 | x: barium site
y: titanium site

EXAMPLE 3

The same raw materials were used in this Example as used in Example 1. Each respective raw material was weighed such that the amounts of principal and subordinate ingredients, constituting the composition of the end products, e.g., barium titanate, lead titanate and calcium titanate, had the composition expressed by $(Ba_{0.7}, Pb_{0.2}, Ca_{0.1})$ $TiO_3+0.002Y_2O_3+0.02SiO_2+0.001$ $MnO_2$. Next, these materials were wet mixed in a ball mill so that the mean particle diameter of the mixed powder conformed to that listed in Table 4 respectively. Then, the mixed powder was dried and calcined. The calcined powder was wet ground in a ball mill to show the ground particle diameter listed in Table 4. Then, the same sample preparation steps as applied to Example 1 followed.

The same evaluation conducted in Example 1 was performed with each respective sample. To examine the extent of structural density of the sintered body, the porosity thereof was measured by means of a mercury injection method. The results of the evaluation are shown in Table 4.

Figure 5:
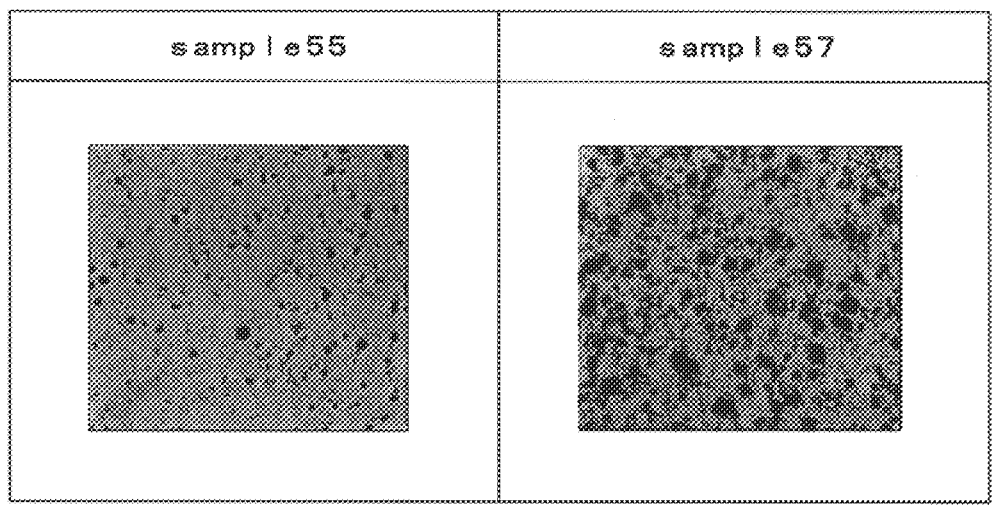
FIG. 5 illustrates scanning electron microscope photo micrographs of a section of positive temperature coefficient thermistors according to the present invention illustrating porosity.

As clearly shown in Table 4, the thermistors which showed a mean powder particle diameter of less than 1.3 μm at the time of mixing the principal ingredient powder with the subordinate ingredient powder, both serving as the raw materials, and which also showed a mean powder particle diameter of 0.6 to 2.0 μm at the stage of grinding, after calcining, had particularly small porosity and a dense structure. The porosity of sample 55 is smaller than that of sample 57. These samples further showed excellent durability against a reducing atmosphere as evidenced by small variations in $R_{25}$ and between φ the times before and after application of voltage. As shown in FIG. 5, scanning electron microscope photographs of thermistors made according to samples 55 and 57 illustrate the difference in porosity.

TABLE 4

| Sample Number | Mean Particle Diameter of Raw Material Mixture (μm) | Mean Particle Diameter of Ground Powder after Calcining (μm) | Porosity (%) | Characteristics before Voltage Application | | Characteristics After Voltage Application | |
|---|---|---|---|---|---|---|---|
| | | | | R25 (Ω) | φ | R25 (Ω) | φ |
| 51 | 0.3 | 0.4 | 14.2 | 78.0 | 6.8 | 23.0 | 2.1 |
| 52 | 0.4 | 2.3 | 12.5 | 90.2 | 6.0 | 35.0 | 2.0 |
| 53 | 0.6 | 0.6 | 3.2 | 450 | 5.8 | 438 | 5.7 |
| 54 | 1.0 | 1.0 | 3.3 | 499 | 5.7 | 485 | 5.6 |
| 55 | 1.3 | 1.5 | 6.2 | 423 | 6.3 | 409 | 6.0 |
| 56 | 1.0 | 2.0 | 5.4 | 386 | 5.4 | 377 | 5.3 |
| 57 | 1.5 | 0.4 | 18.0 | 1018 | 5.5 | 385 | 2.8 |
| 58 | 1.5 | 2.2 | 12.0 | 119 | 7.0 | 23.6 | 2.8 |
| 59 | 1.5 | 1.5 | 16.3 | 121 | 6.5 | 24.6 | 1.8 |

EXAMPLE 4

The use of the positive temperature coefficient thermistor prepared according to the present method in a hot air type heater will be explained.

Figure 4:
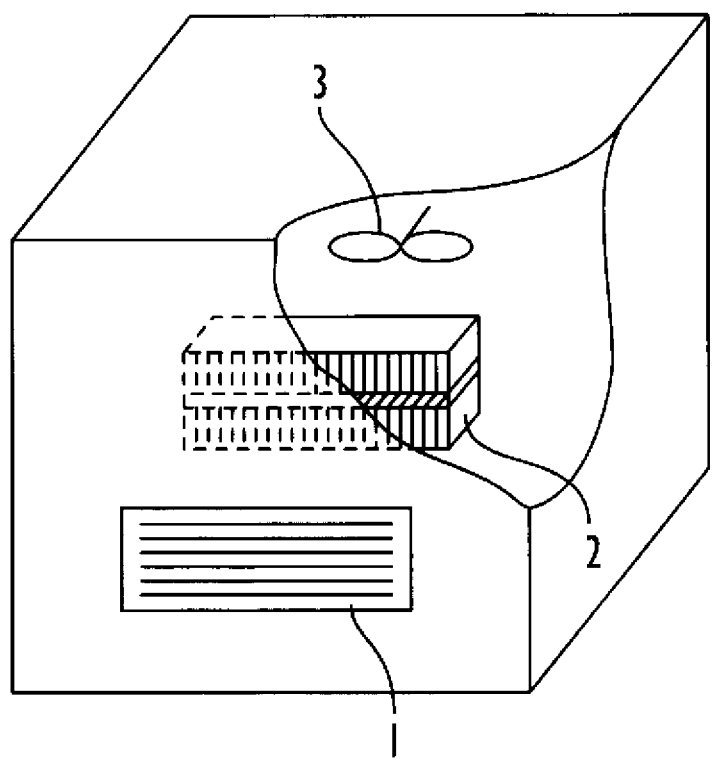
FIG. 4 illustrates a partially cutaway perspective view of a hot air type heater using a positive temperature coefficient thermistor devices according to the present invention.

FIG. 4 is a partial cutaway perspective view of a hot air type heater using a positive temperature coefficient thermistors according to the present invention. In FIG. 4, air sent by a fan 3 located in the back is exposed to and heated by the positive temperature coefficient thermistors 2 which are heated to a specified temperature. The heated air is blown out of a warm air outlet 1 located in the front. The positive temperature coefficient thermistors 2 have a switching temperature of 200° C. to 300° C. Hot air type heaters of this type may be used in an environment wherein organic substances such as gasoline and machine oil, or other organic substances such as edible oil, seasonings and detergents are abundant without deterioration of the positive temperature coefficient thermistors. As a result, a highly reliable hot air type heater can be realized.

In the present invention, "the principal ingredients comprising barium titanate, lead titanate and calcium titanate" are the same in meaning as "the principal ingredients comprising barium lead calcium titanate."

The embodiments described above provide a number of significant advantages. Because the PTC thermistor of the present invention significantly reduces deterioration in resistance-temperature characteristics after the application of voltage in a reducing atmosphere, the thermistor possesses improved durability and reliability. In yet another advantage, the positive temperature coefficient thermistor of the present invention provides improved safety during use in an organic substance which presents a reducing atmosphere by reducing the probability of explosion.

Of course, it should be understood that a wide range of changes and modifications can be made to the preferred embodiment described above. It is therefore intended that the foregoing detailed description be understood that it is the following claims, including all equivalents, which are intended to define the scope of this invention.

We claim:
1. A positive temperature coefficient fired ceramic thermistor having, a principal ingredient comprising
  barium titanate, lead titanate and calcium titanate, and
  a subordinate ingredient comprising silicon dioxide, manganese dioxide, about 0.1 to about 2.0 mol % of aluminum compound and at least one oxide selected from the group consisting of yttrium oxide, lanthanum oxide, samarium oxide, dysprosium oxide, cerium oxide and gallium oxide,
said positive temperature coefficient fired ceramic thermistor being manufactured by a method comprising the steps of:
  a. mixing raw material powder corresponding to the principal ingredient comprising a titanium compound, a barium compound, a lead compound and a calcium compound with raw material powder corresponding to the subordinate ingredient comprising a silicon compound, a manganese compound, an aluminum compound and at least one element selected from the group consisting of yttrium, lanthanum, samarium, dysprosium, cerium and gallium;
  b. calcining the raw material powder mixed in said step (a);
  c. grinding the powder calcined in said step (b) into pieces;
  d. molding the powder ground in said step (c) into shapes; and
  e. firing the shapes molded in said step (d);
wherein the calcium compound in said step (a) comprises calcium titanate powder,
wherein an average particle diameter of the calcium titanate powder in said step (a) is smaller than a mean particle diameter of the remaining components of the raw material powders used in said step (a),
wherein an average particle diameter of said remaining components of said raw material powders used in said step (a) is 1.3 μm or less, and
wherein said positive temperature coefficient fired ceramic thermistor resists deterioration in a reducing atmosphere and shows smaller changes in room temperature resistance, resistance-temperature coefficient and resistance change width over voltage, resulting from employing in step (a) said principal and subordinate ingredients with said average and mean particle diameters of said calcium titanate powder and said remaining component powders and then employing said steps (b)–(e), as compared to a thermistor with principal and subordinate ingredients made by steps (a)–(e) but not having said average and mean particle diameters of said calcium titanate powder and said remaining component powders employed as a raw material prior to calcining.

2. The positive temperature coefficient fired ceramic thermistor according to claim 1, having an average particle diameter of the powder ground in said step (c) ranging from 0.6 to 2.0 µm.

3. A positive temperature coefficient fired ceramic thermistor having, 100 mol % of a principal ingredient comprising about 40 to about 95 mol % of barium titanate, about 4 to about 40 mol % of lead titanate and about 1 to about 20 mol % of calcium titanate, and further comprising by comparison to 100 mol % of said principal ingredient, a subordinate ingredient comprising about 1.0 to about 5.0 mol % of silicon dioxide, about 0.01 to about 0.15 mol % of manganese dioxide, about 0.1 to about 2.0 mol % of aluminum oxide, and at least one oxide selected from the group consisting of yttrium oxide, lanthanum oxide, samarium oxide, dysprosium oxide, cerium oxide and gallium oxide, said positive temperature coefficient fired ceramic thermistor being manufactured by a method comprising the steps of:

a. mixing raw material powder corresponding to the principal ingredient comprising a barium oxide, a lead oxide and a calcium titanate with raw material powder corresponding to the subordinate ingredient comprising a silicon dioxide, a manganese dioxide, an aluminum compound and at least one element selected from the group consisting of yttrium oxide, lanthanum oxide, samarium oxide, dysprosium oxide, cerium oxide and gallium oxide;

b. calcining the raw material powder mixed in said step (a);

c. grinding the powder calcined in said step (b) into pieces;

d. molding the powder ground in said step (c) into shapes; and e. firing the shapes molded in said step (d);

wherein the calcium compound in said step (a) comprises calcium titanate powder, wherein an average particle diameter of the calctium titanate powder in said step (a) is smaller than a mean particle diameter of the remaining components of the raw material powders used in said step (a), wherein an average particle diameter of said remaining components of said raw material used in said step (a) is 1.3 µm or less, wherein said positive temperature coefficient fired ceramic thermistor resists deterioration in a reducing atmosphere and shows smaller changes in room temperature resistance, resistance-temperature coefficients and resistance change width over voltage, resulting from employing in said step (a) said principal and subordinate ingredients with said average and mean particle diameters of said calcium titanate powder and said remaining component powders and then employing said steps (b)–(e), as compared to a thermistor with principal and subordinate ingredients made by steps (a)–(e) but not having said average and mean particle diameters of said calcium titanate powders and said remaining component powders employed as a raw material prior to calcining.

4. The positive temperature coefficient fired ceramic thermistor according to claim 3, wherein an average particle diameter of the powder ground in said step (c) ranges from 0.6 to 2.0 µm.

5. The positive temperature coefficient fired ceramic thermistor according to claim 1 or claim 3, wherein said principal ingredient has a barium site ingredient formed of barium, lead and calcium and a titanium site ingredient, with the composition mol ratio of said barium site to said titanium site being about 1.003 to about 1.030 mol:1.

6. The positive temperature coefficient fired ceramic thermistor according to claim 1 or claim 3, wherein said principal ingredient additionally comprises strontium titanate.

* * * * *